United States Patent
Kawamoto et al.

(10) Patent No.: US 9,464,715 B2
(45) Date of Patent: Oct. 11, 2016

(54) IDLE STOP CONTROL DEVICE FOR VEHICLE EQUIPPED WITH AUTOMATED MANUAL TRANSMISSION

(71) Applicant: Nissan Motor Co., Ltd., Yokohama-shi, Kanagawa (JP)

(72) Inventors: Yoshinobu Kawamoto, Atsugi (JP); Hiroyuki Takenaka, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 66 days.

(21) Appl. No.: 14/417,803

(22) PCT Filed: Jul. 19, 2013

(86) PCT No.: PCT/JP2013/069617
§ 371 (c)(1),
(2) Date: Jan. 28, 2015

(87) PCT Pub. No.: WO2014/038297
PCT Pub. Date: Mar. 13, 2014

(65) Prior Publication Data
US 2015/0219214 A1    Aug. 6, 2015

(30) Foreign Application Priority Data

Sep. 10, 2012   (JP) ................................ 2012-198132

(51) Int. Cl.
*F16H 61/04*    (2006.01)
*F16H 63/50*    (2006.01)
(Continued)

(52) U.S. Cl.
CPC .............. *F16H 63/50* (2013.01); *B60W 10/02* (2013.01); *B60W 10/06* (2013.01); *B60W 10/11* (2013.01); *B60W 30/18018* (2013.01); *B60W 30/18027* (2013.01); *F02D 17/00* (2013.01);
(Continued)

(58) Field of Classification Search
CPC .............. B60W 10/06; B60W 10/113; B60W 2520/04; B60W 2710/1005; B60W 30/18072; B60W 30/181; F16H 2306/18; F16H 2312/022
See application file for complete search history.

(56) References Cited

U.S. PATENT DOCUMENTS 7,757,577 B2 *  7/2010  Kawamoto ............. F16H 59/68
                                              477/906
2010/0151991 A1 *  6/2010  Mair .................... B60W 10/02
                                              477/77

(Continued)

FOREIGN PATENT DOCUMENTS

JP      2001-317389 A     11/2001
JP       2006-83788 A      3/2006
(Continued)

*Primary Examiner* — Ramya Burgess
*Assistant Examiner* — David Morris
(74) *Attorney, Agent, or Firm* — Global IP Counselors, LLP

(57) ABSTRACT

While a vehicle is decelerating starting at a braking start time, start-off pre-shifting starts when speed falls to a predetermined speed. At a vehicle stoppage time, an idle stop permission flag is not set to on if start-off pre-shifting is incomplete, even if idle stop permission conditions have been met. The idle stop permission flag is set to on when start-off pre-shifting is completed, and an idle stop flag is set to on and the engine stopped when engine rotational speed falls below a set speed. The engine is restarted in response to braking being released, and the idle stop flag is set to off and the idle stop control ended when the engine rotational speed reaches or exceeds a set speed. The restarting of the engine causes an engine-driven oil pump to dispense oil to be used as a medium to manifest an automatic clutch command hydraulic pressure.

3 Claims, 4 Drawing Sheets

(51) Int. Cl.
*F02D 17/00* (2006.01)
*F02D 29/02* (2006.01)
*F16H 61/688* (2006.01)
*F02N 11/08* (2006.01)
*B60W 10/02* (2006.01)
*B60W 10/06* (2006.01)
*B60W 10/11* (2012.01)
*B60W 30/18* (2012.01)
*B60W 10/113* (2012.01)

(52) U.S. Cl.
CPC .......... *F02D 29/02* (2013.01); *F02N 11/0818* (2013.01); *F16H 61/688* (2013.01); *B60W 10/113* (2013.01); *B60W 30/181* (2013.01); *B60W 30/18072* (2013.01); *B60W 2520/04* (2013.01); *B60W 2710/1005* (2013.01); *B60Y 2300/192* (2013.01); *B60Y 2400/71* (2013.01); *F02N 11/084* (2013.01); *F02N 2200/022* (2013.01); *F02N 2200/0801* (2013.01); *F02N 2200/0802* (2013.01); *F16H 2306/18* (2013.01); *F16H 2312/022* (2013.01); *F16H 2312/14* (2013.01); *F16H 2312/20* (2013.01); *Y02T 10/48* (2013.01)

(56) References Cited

U.S. PATENT DOCUMENTS

2010/0236231 A1* 9/2010 Miyabe ............... F16H 61/0031
 60/413
2012/0196722 A1* 8/2012 Preisner ............... B60W 10/02
 477/166

FOREIGN PATENT DOCUMENTS

| JP | 2006-234164 A | | 9/2006 |
| JP | 2007-40407 A | | 2/2007 |
| JP | 2008075727 A | * | 4/2008 |
| JP | 2009-127857 A | | 6/2009 |
| JP | 2010-216643 A | | 9/2010 |
| JP | 2011-133013 A | | 7/2011 |
| JP | 2012-6527 A | | 1/2012 |

* cited by examiner

IDLE STOP CONTROL DEVICE FOR VEHICLE EQUIPPED WITH AUTOMATED MANUAL TRANSMISSION

CROSS-REFERENCE TO RELATED APPLICATIONS

This application is a U.S. National stage application of International Application No. PCT/JP2013/069617, filed Jul. 19, 2013, which claims priority to Japanese Patent Application No. 2012-198132 filed in Japan on Sep. 10, 2012, the contents of each of which are hereby incorporated herein by reference.

BACKGROUND

1. Field of the Invention

The present invention relates to an idle stop control device for a vehicle equipped with an automated manual transmission, and in particular to a technique of improving responsiveness when resuming movement after the engine has been shut off while idling.

2. Background Information

An example of a known idle stop control device for vehicles is proposed in Laid-open Japanese Patent Application No. 2006-083788 (FIG. 3).

In this proposed technology, the engine is stopped when predetermined idle stop permission conditions (accelerator position=0; braked state with brakes applied; vehicle speed VSP=0) are met, such as in a stopped state in which there is no intention of starting movement, thereby improving the fuel efficiency of the engine.

SUMMARY

However, the known idle stop control device described above does not take into account the model of the automatic transmission that makes up the powertrain of the vehicle along with the engine being subjected to idle stop control, leading to the following problems when the automatic transmission is an automated manual transmission.

Varieties of automated manual transmissions include dual clutch models comprising two automatic clutches interposed between the engine and the gear shift mechanism, and single clutch models comprising a single automatic clutch.

However, in both kinds of automated manual transmission, the starting gear train can be automatically selected via disengagement/engagement control of an automatic clutch mediated by hydraulic fluid from a pump driven by the engine and start-off pre-shifting control of a selective gear enmeshment mechanism, and power from the engine is outputted via the automatically selected starting gear train to start the vehicle moving.

In an automated manual transmission, the start-off pre-shifting control is performed when the vehicle stops in preparation for when the vehicle resumes movement, placing the transmission into a starting gear selection state and releasing the automatic clutch at the relevant starting gear.

Specifically, start-off pre-shifting is performed by releasing the engagement of the selective gear enmeshment mechanism for the currently selected gear train (placing the gear train into an unselected state) while the vehicle is decelerating, and engaging the selective gear enmeshment mechanism for the starting gear train (placing the starting gear train into a selected state), thereby effecting start-off pre-shifting.

However, during sudden stops in which the vehicle decelerates rapidly, the vehicle may come to a stop before the start-off pre-shifting control (in which the currently selected gear train is deselected and the starting gear train is selected) is complete.

Even during gradual stops in which the vehicle decelerates gradually, if the starting gear train selection process of the start-off pre-shifting does not end after a single iteration (i.e., the starting gear train is not selected at the end of a single iteration) due to synchronization failure or the like, and the process is repeatedly executed, the vehicle may come to a stop before start-off pre-shifting control is complete.

In conventional idle stop control, only a stopped state in which there is no intention of starting movement (acceleration opening=0; braked state with brakes applied; vehicle speed VSP=0) is set as an idle stop permission condition; thus, when the vehicle stops and the idle stop permission condition is met, the engine is stopped via idle stop control even if the start-off pre-shifting control is not yet complete.

Because start-off pre-shifting of the automated manual transmission is performed using hydraulic fluid from an engine-driven pump, when the vehicle is stopped via idle stop control before the start-off pre-shifting is complete, as described above, the flow of hydraulic fluid from the pump abates, and start-off pre-shifting is interrupted before being completed.

Start-off pre-shifting that has been interrupted in this way is resumed only after the driver performs a resume movement request operation, the engine is restarted in response thereto, and the pump dispenses hydraulic fluid.

Thus, until the engine is restarted in response to the resume movement request operation, the flow of hydraulic fluid from the engine-driven pump resumes, and start-off pre-shifting is completed, movement resumption control, such as advancing the engagement of the automatic clutch, cannot be initiated, leading to the problem of a corresponding increase in delay in movement resumption response.

An object of the present invention is to solve the problems described above by proposing an idle stop control device for a vehicle equipped with an automated manual transmission, the device being based on the concept that the problem of increased delays in movement resumption responsiveness can be solved by including the completion of automated manual transmission start-off pre-shifting in idle stop permission conditions and stopping the idling engine after start-off pre-shifting is complete.

In order to achieve the object proposed above, the idle stop control device for a vehicle equipped with an automated manual transmission according to the present invention is configured as follows.

First, in describing the idle stop control device constituting the basis of the present invention, the device is:

an idle stop control device for use in a vehicle equipped with an idle stop engine that is stopped when predetermined idle stop permission conditions including vehicle stoppage are met, and an automated manual transmission in which a starting gear train can be automatically selected via disengage/engagement control of an automatic clutch mediated by a medium supplied by a pump driven by the engine and start-off pre-shifting control of a selective gear enmeshment mechanism, and power from the engine is outputted via the automatically selected starting gear train to allow the vehicle to start moving.

The idle stop control device of the present invention includes a start-off pre-shifting completion assessment controller or means for assessing whether the start-off pre-shifting control is complete when the vehicle is stopped, and an assessment by the means that the start-off pre-shifting control is complete is included in the idle stop permission conditions.

In accordance with the idle stop control device of the present invention as described above, idle stops are only permitted when the start-off pre-shifting control is complete, thereby preventing the engine from being subjected to an idle stop when the vehicle stops before start-off pre-shifting control is complete.

As a result, when the engine is subjected to an idle stop, start-off pre-shifting control has completed.

Thus, when the engine is restarted in response to a resume movement request operation performed by a driver after an idle stop, movement resumption control, such as advancing the engagement of the automatic clutch, can immediately be initiated by the medium supplied by the engine-driven pump, allowing for the elimination of the problem of increased movement resumption response delays following idle stops presented by the prior art, and enabling improved movement resumption responsiveness.

BRIEF DESCRIPTION OF THE DRAWINGS

Referring now to the attached drawings which form a part of this original disclosure.

DETAILED DESCRIPTION OF EMBODIMENTS

An embodiment of the present invention will now be described on the basis of the appended drawings.

First Embodiment

Configuration of Embodiment

Figure 1:
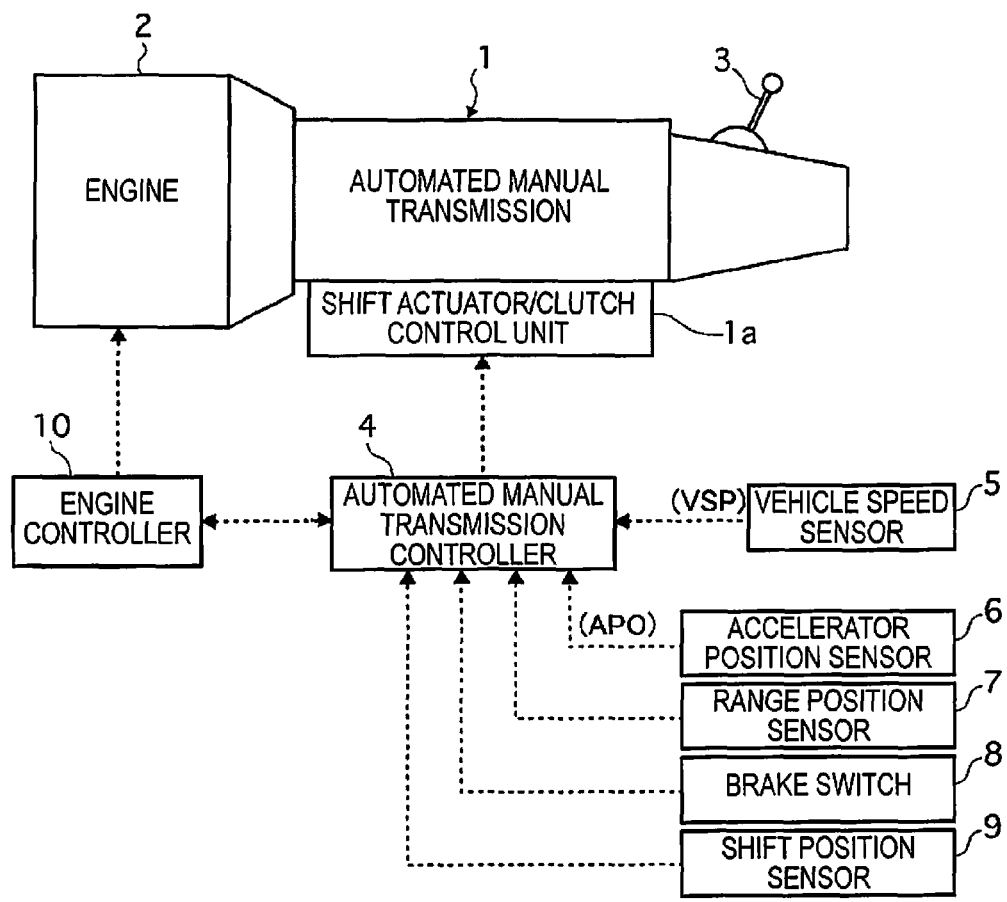
FIG. 1 is a schematic diagram of a powertrain of a vehicle equipped with an automated manual transmission, the vehicle being provided with an idle stop control device according to an embodiment of the present invention, and a control system for the same.

FIG. 1 shows a powertrain of a vehicle equipped with an automated manual transmission, the vehicle being provided with an idle stop control device according to an embodiment of the present invention, and a control system for the same.

Reference symbol 1 is an automated manual transmission that will be described later with reference to FIG. 2. Rotation from an engine 2 is input from the left end as seen in the drawing, and this input rotation is converted according to the selected gear stage (gear train) and outputted to the wheels from the right end as seen in the drawing. This driving of the wheels causes the vehicle to travel.

The automated manual transmission 1 is provided with a selection lever 3 for directing gear shifting via manual operation.

A P range position at which the automated manual transmission 1 is set to a parking (P) range, an R range position at which the transmission is set to a reverse (R) range, an N range position at which the transmission is set to a neutral (N) range, and a D range position at which the transmission is set to a forward automatic transmission (D) range are set as operational positions for the selection lever 3.

The automated manual transmission 1 performs automatic gear shift control using an automated manual transmission controller 4 via a shift actuator/clutch control unit 1a.

To this end, a signal from a vehicle speed sensor 5 for detecting a vehicle speed VSP, a signal from an accelerator position sensor 6 for detecting an accelerator position APO, a signal from a range position sensor 7 for detecting the range positions P, R, N, D of the selection lever 3, a signal from a brake switch 8 that turns on only when a brake pedal is being depressed, and a signal from a shift position sensor 9 for detecting the shift position of the synchromesh mechanism (selective gear enmeshment mechanism) for each gear train are inputted to the automated manual transmission controller 4.

An engine controller 10 ordinarily controls the engine 2, and the engine controller 10 also performs idle stop control, to be described hereafter.

For this reason, the engine controller 10 exchanges information with the automated manual transmission controller 4, including the abovementioned signals inputted to the controller 4.

Figure 2:
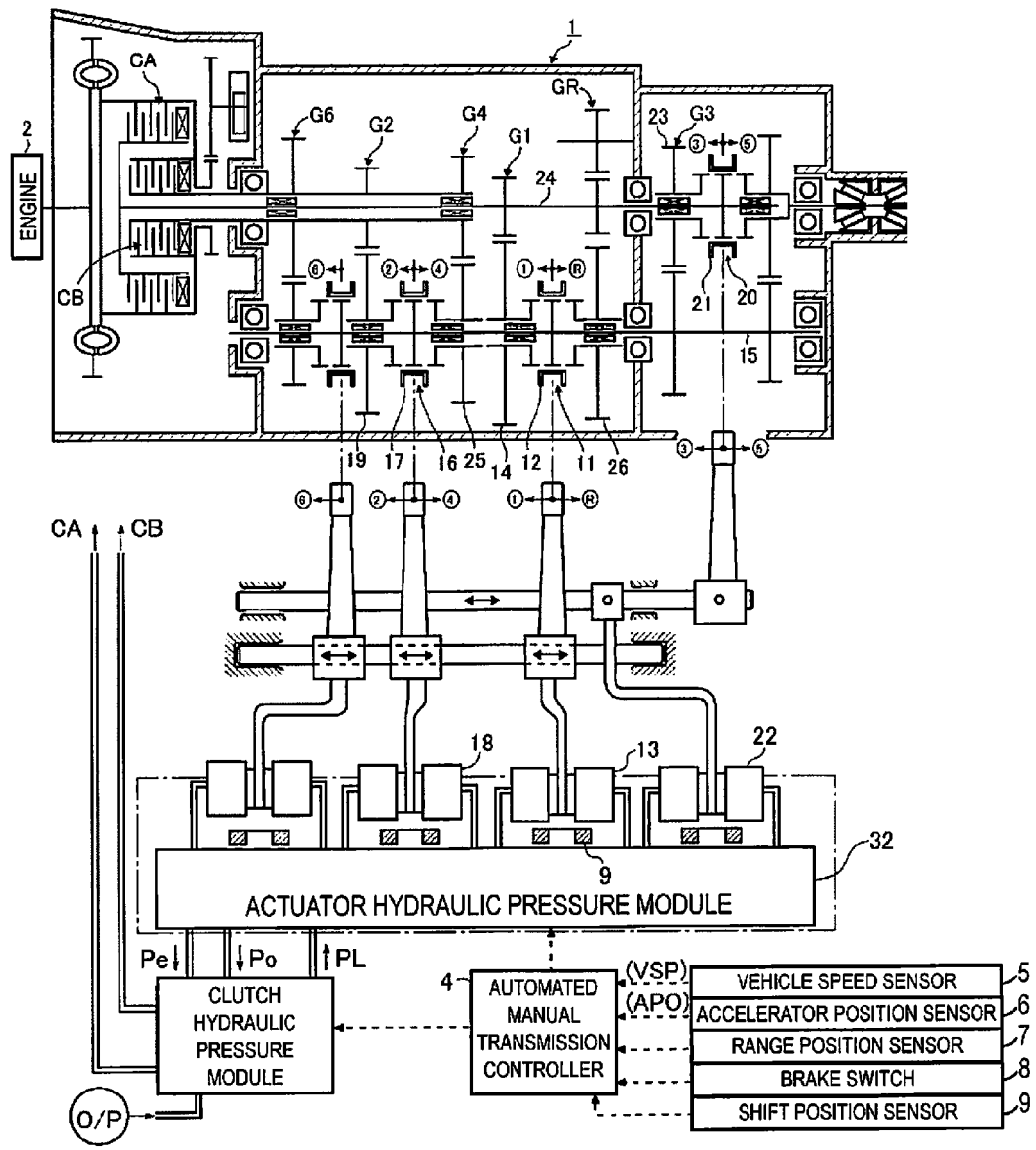
FIG. 2 is an overview of the automated manual transmission shown in FIG. 1 along with a gear shift control system for the same.

FIG. 2 is a schematic diagram of the automated manual transmission 1 along with a gear shift control system for the same.

The automated manual transmission 1 is configured as a dual clutch automated manual transmission. This dual clutch automated manual transmission and automatic gear shift control system associated therewith are identical to those disclosed in Laid-open Japanese Patent Application No. 2007-040407, and a detailed description thereof will be omitted in the present description, but the automatic gear shift operation is performed using oil from an oil pump O/P driven by the engine 2 as a medium, and will be described in brief hereafter.

When first gear is selected from neutral in order to start the vehicle moving forward, with the automatic clutches CA, CB (hereafter simply "clutches") of the two gear stage groups disengaged, a coupling sleeve 12 of a first gear synchromesh mechanism (selective gear enmeshment mechanism) 11 is moved left as seen in the drawing from a neutral position by a shift actuator 13 and shifted (pre-shifted) to a first gear selection position (first gear shift gear engaged position), thereby coupling a first gear output gear 14 to a countershaft 15 and selecting a first gear transmission gear train G1.

In this state, the clutch CA for the gear stage group for first gear can be engaged to form the first gear transmission gear train.

Simultaneously with the pre-shift to first gear as described above, a coupling sleeve 17 of a second to fourth gear synchromesh mechanism (selective gear enmeshment mechanism) 16 is moved left as seen in the drawing from a neutral position by a shift actuator 18 and shifted to a second gear selection position (second gear shift gear engaged position), thereby coupling a second gear output gear 19 to the countershaft 15 and pre-shifting to second gear for selecting a second gear transmission gear train G2.

When upshifting from first gear to second gear, the clutch CB for the gear stage group for second gear is progressively engaged, and, once the clutch has been engaged to a certain degree, clutch switch control in which the clutch CA for the gear stage group for first gear is disengaged can be performed in order to shift (i.e., switch transmission gear trains) from first gear to second gear.

Following this shift from first to second gear, a coupling sleeve 21 of a third gear synchromesh mechanism (selective gear enmeshment mechanism) 20 is moved left as seen in the drawing from a neutral position by a shift actuator 22 and shifted to a third gear selection position (third gear shift gear engaged position), thereby coupling a third gear input gear 23 to a corresponding input shaft 24 and pre-shifting to third gear for selecting a third gear transmission gear train G3.

When upshifting from second gear to third gear, the clutch CB for the gear stage group for third gear is progressively engaged, and, once the clutch has been engaged to a certain degree, clutch switch control in which the clutch CA for the gear stage group for second gear is disengaged is performed in order to shift (i.e., switch transmission gear trains) from second gear to third gear.

Following this shift from second to third gear, the coupling sleeve 17 for a second to fourth gear synchromesh mechanism (selective gear enmeshment mechanism) 16 is returned by the shift actuator 18 from the second gear selection position (second gear shift gear engaged position) to a neutral position, then moved to the right from the neutral position to a fourth gear selection position (fourth gear shift gear engaged position), thereby coupling a fourth gear output gear 25 to the countershaft 15 and pre-shifting to fourth gear for selecting a fourth gear transmission gear train G4.

By performing similar switching control of the clutches CA, CB and pre-shifting in sequence, it is possible to upshift from third gear to fourth gear, from fourth gear to fifth gear (gear train G5), and from fifth gear to sixth gear (gear train G6) (transmission gear train switching/selection).

When downshifting in sequence from sixth gear to first gear, a predetermined downshift (transmission gear train switch) can be performed by performing switch control of the clutches CA, CB and sequentially pre-shifting in a manner opposite that as for upshifting.

When selecting the reverse gear stage from neutral in order to start the vehicle moving backward, with the clutches CA, CB for the two gear stage groups disengaged, the coupling sleeve 12 of a reverse synchromesh mechanism (selective gear enmeshment mechanism) 11 is moved from the neutral position to the right as seen in the drawing by the shift actuator 13 and shifted (pre-shifted) to a reverse selection position (reverse shift gear engaged position), thereby coupling a reverse output gear 26 to the countershaft 15 and selecting a reverse transmission gear train GR.

In this state, the clutch CA for the gear stage group for the reverse gear stage can be engaged to form the reverse transmission gear train.

When performing such automatic gear shift control in a manual transmission, it is necessary to detect the shift positions of the synchromesh mechanisms (selective gear enmeshment mechanisms) for use in the gear shift control.

To detect the shift positions of the synchromesh mechanisms, a magnetic coupling shift position sensor (in FIG. 2, only the 1-R shift position sensor is labeled 9) comprising a permanent magnet that operates in association with changes in shift position and a sensor for detecting the magnetic flux thereof is used.

When shifting gears as described above, the operation of each of the shift actuators 13, 18, 22 (shifting of the synchromesh mechanisms 11, 16, 20) is individually controlled by the controller 4 via an actuator hydraulic pressure module 32 as described hereafter.

There shall now be described a case in which, for example, pre-shifting from neutral to first gear is performed in order to start the vehicle moving forward.

The controller 4 issues an electronic control command to shift (pre-shift) the coupling sleeve 12 of the first gear synchromesh mechanism (selective gear enmeshment mechanism) 11 left from the neutral position shown in FIG. 2 to the first gear selection position (first gear shift gear engaged position).

Upon receiving this command, the actuator hydraulic pressure module 32 outputs hydraulic pressure for shifting (pre-shifting) the coupling sleeve 12 of the first gear synchromesh mechanism (selective gear enmeshment mechanism) 11 to the first gear selection position (first gear shift gear engaged position) to the shift actuator 13.

In response to this hydraulic pressure, the shift actuator 13 shifts the coupling sleeve 12 of the first gear synchromesh mechanism (selective gear enmeshment mechanism) 11 to the first gear selection position (first gear shift gear engaged position), thereby allowing the desired pre-shift to be performed.

During this process, the controller 4 loads sensor detection values from the shift position sensor 9, which continuously detects the shift position of the first gear synchromesh mechanism (selective gear enmeshment mechanism) 11.

When the sensor detection value reaches a value corresponding to the first gear selection position (first gear shift gear engaged position) of the first gear synchromesh mechanism (selective gear enmeshment mechanism) 11, the controller 4 determines that the first gear synchromesh mechanism (selective gear enmeshment mechanism) 11 has reached the first gear selection position (first gear shift gear engaged position) and pre-shifting is complete, and issues a command to set the actuation hydraulic pressure of the shift actuator 13 to zero.

In response to this command, the actuator hydraulic pressure module 32 set the actuation hydraulic pressure of the shift actuator 13 to zero, sets the shifting force by which the shift actuator 13 pushes the coupling sleeve 12 of the first gear synchromesh mechanism (selective gear enmeshment mechanism) 11 to the first gear selection position (first gear shift gear engaged position) to zero, and ends pre-shifting control.

Next, a case in which pre-shifting from neutral to the reverse gear stage in order to start the vehicle moving backward will be described.

The controller 4 issues an electronic control command to shift (pre-shift) the coupling sleeve 12 of the reverse synchromesh mechanism (selective gear enmeshment mechanism) 11 right from the neutral position shown in FIG. 2 to the reverse selection position (reverse shift gear engaged position).

Upon receiving this command, the actuator hydraulic pressure module 32 outputs hydraulic pressure for shifting (pre-shifting) the coupling sleeve 12 of the reverse synchromesh mechanism (selective gear enmeshment mechanism) 11 to the reverse selection position (reverse shift gear engaged position) to the shift actuator 13.

In response to this hydraulic pressure, the shift actuator 13 shifts the coupling sleeve 12 of the reverse synchromesh mechanism (selective gear enmeshment mechanism) 11 to the reverse selection position (reverse shift gear engaged position), thereby allowing the desired pre-shift to be performed.

During this process, the controller 4 loads sensor detection values from the shift position sensor 9, which continuously detects the shift position of the reverse synchromesh mechanism (selective gear enmeshment mechanism) 11.

When the sensor detection value corresponds to the reverse selection position (reverse shift gear engaged position) of the reverse synchromesh mechanism (selective gear enmeshment mechanism) 11, the controller 4 determines that the reverse synchromesh mechanism (selective gear enmeshment mechanism) 11 has reached the reverse selection position (reverse shift gear engaged position) and pre-shifting is complete, and issues a command to set the actuation hydraulic pressure of the shift actuator 13 to zero.

In response to this command, the actuator hydraulic pressure module 32 set the actuation hydraulic pressure of the shift actuator 13 to zero, sets the shifting force by which the shift actuator 13 pushes the coupling sleeve 12 of the reverse synchromesh mechanism (selective gear enmeshment mechanism) 11 to the reverse selection position (reverse shift gear engaged position) to zero, and ends pre-shifting control.

Idle Stop Control

Engine idle stop control performed by a vehicle equipped with the automated manual transmission 1 will now be described.

While the vehicle is decelerating prior to coming to a stop, which is one of the conditions for permitting idle stop control, the automated manual transmission 1 performs start-off pre-shifting in preparation for resuming movement after coming to a stop.

Specifically, while the vehicle is decelerating, the automatic clutch CA or CB for the currently selected gear train is disengaged (thereby putting both automatic clutches CA and CB into disengaged states), the gear enmeshment of the selective gear enmeshment mechanism for the currently selected gear train is disengaged (putting the gear train into an unselected state), and the selective gear enmeshment mechanism 11 of the starting gear train (the first gear gear train if the vehicle is traveling forward) is enmeshed by the shifting of the coupling sleeve 12 is the corresponding direction (left in FIG. 2) to put the starting gear train (first gear gear train) into a selected state.

During abrupt stops in which the vehicle decelerates at a rapid rate, and during gradual stops in which the vehicle decelerates gradually but the start-off pre-shifting starting gear train selection process is not finished after a single iteration due to synchronization failure or the like and is repeatedly executed, the vehicle may come to a stop before the start-off pre-shifting described above (in which the selected gear train is deselected and the starting gear train is selected) is complete.

If only a stopped state in which there is no intention of starting off (accelerator position APO=0; braked state with brake switch 8 on; vehicle speed VSP=0) is designated as an idle stop permission condition, as in typical idle stop control, the engine 2 will be stopped via idle stop control if the vehicle stops and the idle stop permission condition is met, even if the start-off pre-shifting control has not yet finished.

Because pre-shifting (including start-off pre-shifting) of the automated manual transmission 1 is performed using hydraulic fluid from the oil pump O/P driven by the engine 2 as a medium, when the engine is stopped via idle stop control before start-off pre-shifting is complete, as described above, the flow of hydraulic fluid from the oil pump O/P abates, thereby interrupting start-off pre-shifting before it is complete.

Start-off pre-shifting that has been interrupted in this way is resumed only after the driver performs a resume movement request operation by, for example, taking a foot off the brake pedal, the engine 2 is restarted in response thereto, and hydraulic fluid is dispensed by the oil pump O/P.

Thus, until start-off pre-shifting is complete after being resumed after the resume movement request operation has been performed (i.e., after the engine 2 has been restarted), movement resumption control such as advancing the engagement of the automatic clutch CA cannot be initiated, leading to the problem of a corresponding increase in delay in movement resumption response.

Figure 3:
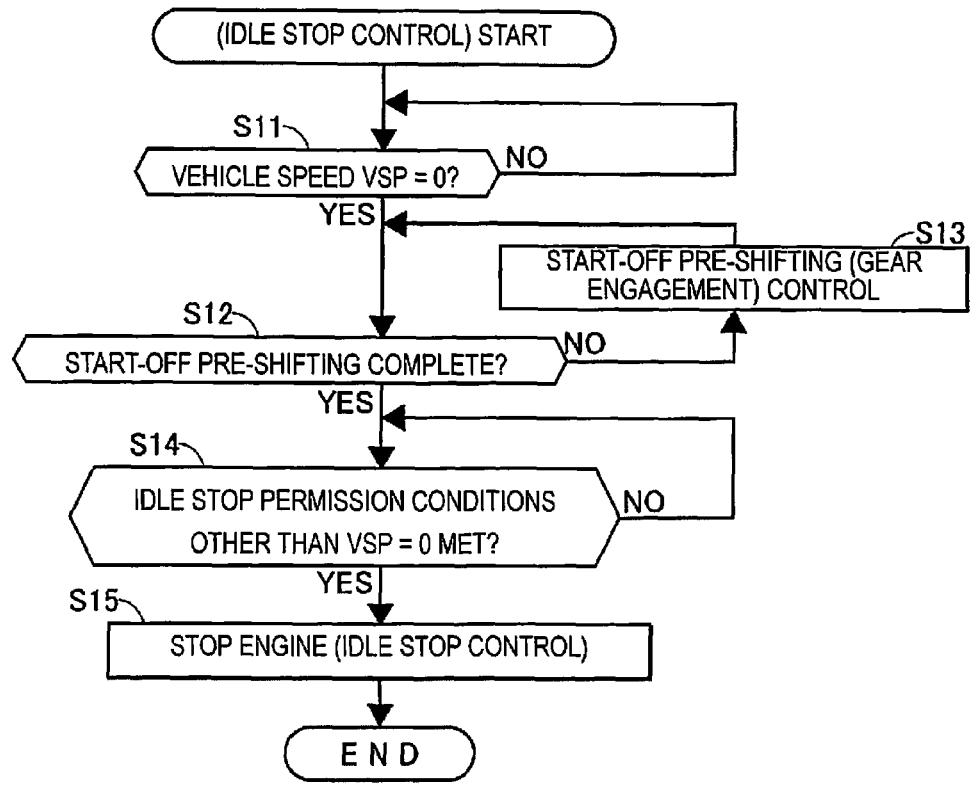
FIG. 3 is a flow chart showing an idle stop control program executed by the engine controller shown in FIG. 1.

In the present embodiment, the engine controller 10 executes the control program shown in FIG. 3 and performs idle stop control on the engine 2 in order to solve this problem. In step S11, it is checked whether the condition vehicle speed VSP=0 (vehicle stopped), which is one of the idle stop permission conditions, has been met, and if it is not the case that vehicle speed VSP=0 (vehicle stopped), control is returned to its previous state and the controller stands by, as idle stop control is unnecessary.

If it is assessed in step S11 that the condition vehicle speed VSP=0 (vehicle stopped) has been attained, it is then checked, in step S12, whether the start-off pre-shifting (in which the selected gear train is deselected and the first gear gear train G1 is selected) is complete on the basis of the signal from the shift position sensor 9.

Step S12 is thus equivalent to the start-off pre-shifting completion assessment means of the present invention.

During the period in which it is assessed in step S12 that start-off pre-shifting is not complete, start-off pre-shifting is continued in step S13, and the controller returns control to step S12 and stands by.

When it is assessed in step S12 that start-off pre-shifting is complete, control is advanced to step S14, and it is checked whether the idle stop permission conditions other than vehicle speed VSP=0 (vehicle stopped) (viz., accelerator position APO=0 and brake switch 8 is on) has been met.

During the period in which it is assessed in step S14 that the idle stop permission conditions other than vehicle speed VSP=0 (vehicle stopped) have not been met, control is returned to its previous state and the controller stands by, as idle stop control is not necessary. When it is assessed that the idle stop permission conditions have been met, the engine 2 is stopped via idle stop control upon falling below a set rotational speed in step S15.

Figure 4:
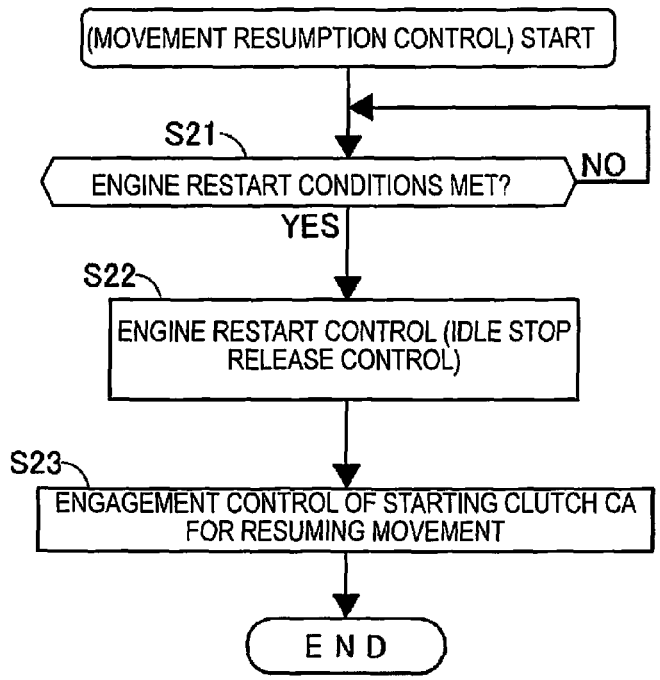
FIG. 4 is a flowchart showing a movement resumption control program executed by the engine controller and automated manual transmission controller shown in FIG. 1 to resume movement following an idle stop.

When resuming movement after an idle stop, the engine controller 10 and the automated manual transmission controller 4 execute the control program shown in FIG. 4 and perform movement resumption control on the vehicle.

In step S21, it is checked whether engine restart conditions (such as the brake switch 8 going from on to off due to brake operation being released) have been met in an idle stop state, and control is returned to its previous state and the system stands by until the engine restart conditions have been met.

When it is assessed in step S21 that the engine restart conditions have been met, the engine controller 10 reinitiates operation by performing idle stop release control on the engine 2 in step S22.

Next, in step S23, the automated manual transmission controller 4 performs engagement advancement control on the starting clutch CA for the first gear gear train G1 in order to start the vehicle off.

Because an idle stop is performed on the engine 2 after the start-off pre-shifting (deselection of selected gear train and selection of first gear gear train G1) described with reference to FIG. 3 is complete, i.e., because selection of the first gear gear train G1 has been completed when an idle stop is performed, the advancement of the engagement of the starting clutch CA allows power from the engine to be transmitted to the wheels via the first gear gear train G1, allowing the vehicle to resume movement.

Effects of Embodiment

In accordance with the idle stop control of the present embodiment, the addition of step S12 includes the completion of start-off pre-shifting (deselection of the selected gear train and selection of the first gear gear train G1) into the idle stop permission conditions so that idle stops are performed on the engine 2 after the start-off pre-shifting (deselection of the selected gear train and selection of the first gear gear train G1) is complete, thereby allowing the following effects to be obtained.

Figure 5:
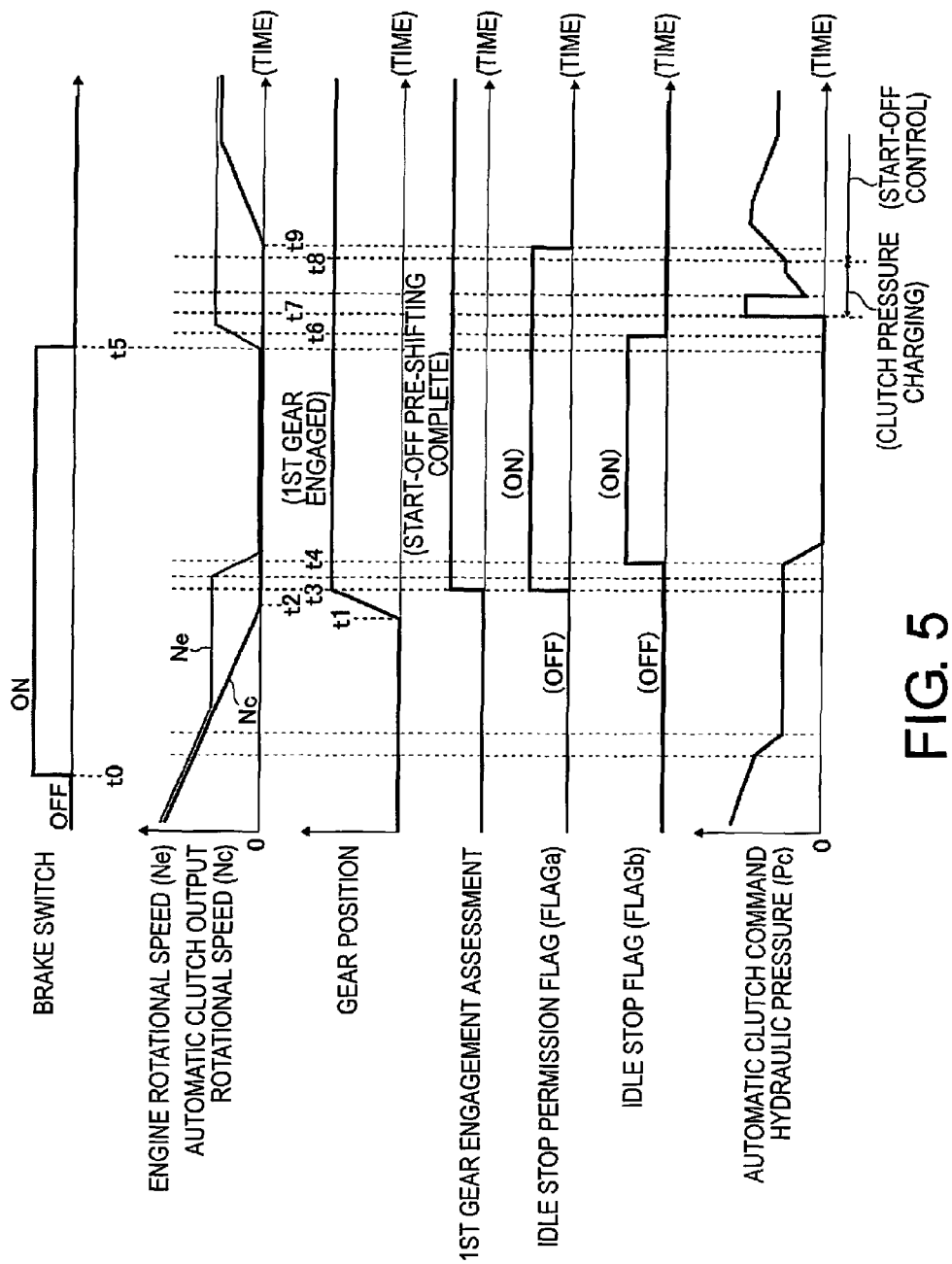
FIG. 5 is an operation time chart of the idle stop control and movement resumption control shown in FIGS. 3 and 4.

A case will be described in which braking is started (brake switch turned on) at a time t0, the vehicle is stopped (automatic clutch output rotational speed Nc=0) at a time t2, and braking is released (brake switch turned off) at a time t5, as shown in FIG. 5.

While the vehicle is decelerating after braking has been initiated at time t0, start-off pre-shifting (deselection of the selected gear train and selection of the first gear gear train G1) as shown in the form of a change in gear position is started at a time t1 when a predetermined low speed is reached.

At a time t2 at which the vehicle is stopped (Nc=0), the start-off pre-shifting (deselection of the selected gear train and selection of the first gear gear train G1) is not yet complete, as ascertained by a first gear engagement assessment; thus, even if the idle stop permission conditions including vehicle stoppage have been met, an idle stop permission flag FLAGa is not set to on, and an idle stop is not performed on the engine 2.

When start-off pre-shifting completes at a start-off pre-shifting (deselection of the selected gear train and selection of the first gear gear train G1) completion time t3, the satisfying of the other idle stop permission conditions including vehicle stoppage causes the idle stop permission flag FLAGa to be set to on, an idle stop flag FLAGb is set to on at a time t4 at when the engine rotational speed Ne becomes less than a set rotational speed, and the operation of the engine 2 is stopped so that engine rotational speed Ne=0.

In response to a resume movement request operation (step S21) caused by the brakes being released (brake switch being turned off) at time t5, the engine 2 is restarted so that the engine rotational speed Ne climbs from 0 (step S22).

At a time t6 at which the engine rotational speed Ne thus reaches or exceeds a set rotational speed, the idle stop flag FLAGb is set to off, and engine idle stop control is ended.

The restarting of the engine 2 causes the engine-driven oil pump O/P to dispense oil, and this oil can be used as a medium to achieve an automatic clutch command hydraulic pressure Pc.

The automatic clutch command hydraulic pressure Pc causes the starting clutch CA to be charged with hydraulic pressure (pre-charged) during the period from a time t7 to a time t8, effecting a rapid loss stroke, after which the engagement of the starting clutch CA is gradually advanced.

The advancement of the engagement of the starting clutch CA allows the automated manual transmission 1 to transmit engine power to the wheels via the first gear gear train G1, causing the vehicle to start off at a time t9.

At time t9, when the vehicle begins starting off, the idle stop permission condition of vehicle speed VSP=0 is eliminated, causing the idle stop permission flag FLAGa to be set to off.

In the present embodiment, the completion of start-off pre-shifting (deselection of the selected gear train and selection of the first gear gear train G1) is included in the idle stop permission conditions (step S12), and an idle stop is performed on the engine 2 after the start-off pre-shifting (deselection of the selected gear train and selection of the first gear gear train G1) is complete.

It is thus possible to eliminate the problem, inherent in the prior art, of increased delays in movement resumption responsiveness after an idle stop, thereby improving movement resumption responsiveness, without the need for a process of completing start-off pre-shifting (deselection of the selected gear train and selection of the first gear gear train G1) during the period leading up to time t7, at which a starting clutch CA engagement stroke is begun, after the engine restarts in response to a resume movement request operation (step S21) sent as the result of braking being released (i.e., the brake switch being turned off) at time t5.

In the present embodiment, the automated manual transmission 1 is configured as a dual clutch automated manual transmission in which the gear trains are divided into two groups and automatic clutches CA, CB are provided for each group, and, when assessing whether start-off pre-shifting is complete, start-off pre-shifting is assessed as being complete when both deselection of the selected gear train and selection of the first gear gear train G1 are complete.

Thus, gear trains not used to resume movement following an idle stop are deselected while movement is being resumed, making it possible to prevent those gear trains from causing shocks during resumption of movement.

Other Embodiments

In the embodiment described above, idle stop control performed while the vehicle is traveling forward is described, but idle stop control performed while the vehicle is traveling in reverse is similar to idle stop control performed while the vehicle is traveling forward, except that the start-off pre-shifting uses the reverse gear train GR.

In the embodiment described above, the automated manual transmission 1 is a dual clutch automated manual transmission in which the gear trains are divided into two groups and automatic clutches CA, CB are provided for each group.

However, it will be apparent that similar effects can be obtained by applying the concept of the present invention to cases in which the automated manual transmission 1 is a single clutch automated manual transmission in which an ordinary manual transmission is automated so as to be capable of automatic gear shifting.

The invention claimed is:

1. An idle stop control device for a vehicle equipped with an idle stop engine that is stopped when predetermined idle stop permission conditions, including vehicle stoppage, are met, and an automated manual transmission in which a gear train is automatically selected as a starting gear train via disengagement/engagement control of an automatic clutch, the automated manual transmission mediated by a medium supplied by a pump driven by the engine and start-off shifting control of a gear enmeshment mechanism, and power from the engine is outputted via the automatically selected starting gear train to allow the vehicle to start moving, the device comprising:

a start-off shifting completion assessment controller programmed to assess whether the start-off shifting control is complete when the vehicle is stopped, and to communicate when the start-off shifting control is complete.

2. The idle stop control device for the vehicle equipped with the automated manual transmission according to claim 1, the automated manual transmission including a plurality of gear trains divided into two groups, one of the plurality of gear trains being the starting gear train, the automatic clutch being one of a plurality of automatic clutches, each gear train group including one of the automatic clutches, and the start-off shifting control enabling the gear enmeshment mechanism for the starting gear train of the plurality of gear trains to be shifted to a gear enmeshment position and the gear enmeshment mechanism for a gear train of the plurality of gear trains not used to start off to be shifted to a gear enmeshment position, wherein the start-off shifting completion assessment controller is programmed to assess whether the start-off shifting control is complete when both shifting of the gear enmeshment mechanism for the starting gear train and shifting of the gear enmeshment mechanism for the gear train not used to start off are complete.

3. The idle stop control device for the vehicle equipped with the automated manual transmission according to claim 1, wherein the start-off shifting completion assessment controller is programmed to communicate when the start-off shifting control is not complete so as to prevent idle stop control.

* * * * *